United States Patent [19]
Wiedeman et al.

[11] Patent Number: 5,796,760
[45] Date of Patent: Aug. 18, 1998

[54] MULTIPATH COMMUNICATION SYSTEM OPTIMIZER

[75] Inventors: Robert A. Wiedeman. Los Altos; Paul Monte. San Jose, both of Calif.

[73] Assignee: Globalstar L.P., San Jose, Calif.

[21] Appl. No.: 903,166

[22] Filed: Jul. 30, 1997

Related U.S. Application Data

[63] Continuation of Ser. No. 239,750, May 9, 1994.

[51] Int. Cl.$^6$ .............................. H04K 1/02; H04B 7/02
[52] U.S. Cl. .................... 375/200; 375/267; 375/211; 370/320
[58] Field of Search ........................ 375/200, 211, 375/206, 267, 295, 219, 299, 316, 347, 225, 226, 227, 229, 260; 370/320, 335, 279, 293, 315, 316; 455/427, 13.1, 7, 137, 132, 226.1, 59

[56] References Cited

U.S. PATENT DOCUMENTS

| | | | |
|---|---|---|---|
| 4,639,937 | 1/1987 | McRae et al. | 375/267 |
| 4,901,307 | 2/1990 | Gilhousen et al. | 370/320 |
| 5,109,390 | 4/1992 | Gilhousne et al. | 375/200 |
| 5,233,626 | 8/1993 | Ames | 455/13.1 |
| 5,265,119 | 11/1993 | Gilhousen et al. | 370/335 |
| 5,280,472 | 1/1994 | Gilhousen et al. | 370/335 |
| 5,303,286 | 4/1994 | Wiedeman et al. | 455/426 |
| 5,305,349 | 4/1994 | Dent | 370/209 |
| 5,416,797 | 5/1995 | Gilhousen et al. | 375/209 |
| 5,592,481 | 1/1997 | Wiedeman et al. | 370/316 |
| 5,619,525 | 4/1997 | Wiedeman et al. | 375/200 |
| 5,664,006 | 9/1997 | Monte et al. | 370/320 |

*Primary Examiner*—Tesfaldet Bocure
*Attorney, Agent, or Firm*—Perman & Green, LLP

[57] ABSTRACT

A multi-path device includes a plurality of communication paths being defined between a plurality of first transceivers and one second transceiver. Each communication path contains at least one repeater. Each signal transmission from the first transceiver to the second transceiver contains an identifiable copy of an identical signal copy over each communication path. There is a signal quality determining portion associated with the second transceiver for determining the quality of the signal copy received by the second transceiver via each of said communication paths. A communication path limiting portion controls the strength of each communication path based upon said signal quality determining portion. It is envisioned that this device may use a CDMA communication protocol.

4 Claims, 7 Drawing Sheets

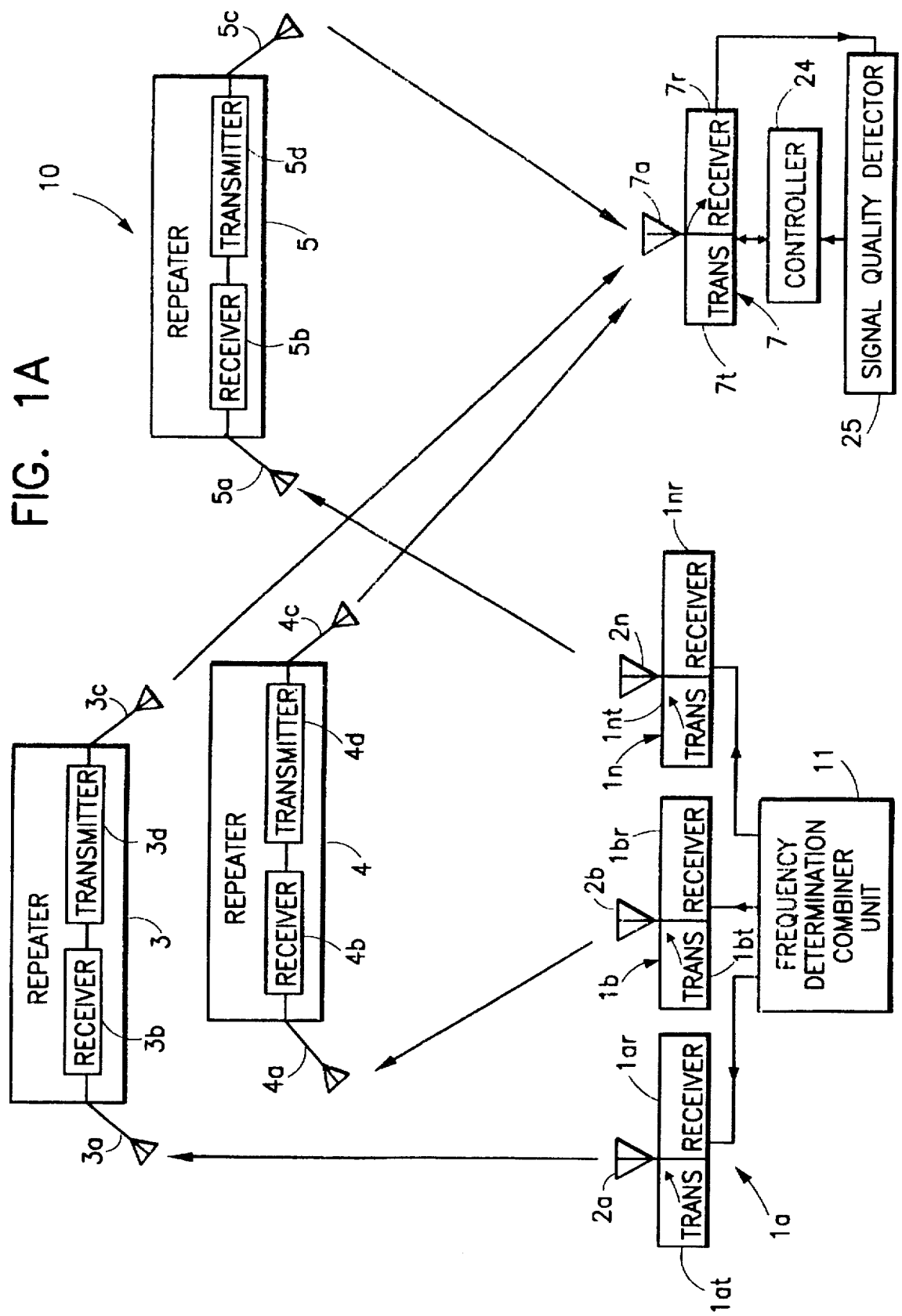

NOTES: [A] PHASE TRANSITIONS OCCUR AT CHIP BOUNDARIES, CHIP TIME = TC BS≈2/TC + MAX DOPPLER SPREAD
[B] PHASE TRANSITIONS OCCUR AT SYMBOL BOUNDARIES, DATA SYMBOL TIME=TD Bi≈2/TD+MAX DOPPLER SPREAD

MULTIPATH COMMUNICATION SYSTEM OPTIMIZER

This is a continuation of copending application Ser. No. 08/239,750 filed on May 9, 1994.

FIELD OF THE INVENTION

This invention relates generally to communications systems and, in particular, to communications systems that utilize multiple communication paths formed from a plurality of first transceivers which transmit an identical copy of an identical signal to a second transceiver. Future transmissions along each communication path depends upon the signal quality received by the second transceiver along each communication path.

BACKGROUND OF THE INVENTION

Two problems that occur in communication systems are referred to as dropout and fade. These problems arise in multi-path systems, wherein a signal proceeds to a receiver along a plurality of communication paths of different transmission lengths, with the received signal being a composite of different signals having randomly varying delays and amplitudes.

One approach to dealing with these multi-path problems is described in the article "A Communication Technique For Multi-Path Channels" by R. Price and P. E. Green, Jr. (Proceedings of the IRE, March 1958, pages 555–570). These authors describe a system that performs a continuous, detailed measurement of a single multi-path characteristic. This knowledge is then exploited to combat the effects of multi-path fading. Specifically, selective fading is treated by first detecting the individual echo signal, and then adding the signals using an appropriate algebraic correlation technique. Inter-symbol interference is dealt with by reinserting different delays into the various detected echoes. This system is referred to as a "Rake" system.

In general, the purpose of the Rake system is to equalize the signal dispersion from a single transmitter through an ionospheric multi-path medium, thereby reducing the inter-symbol interference and improving the signal-to-noise ratio (SNR). The Rake system is applicable to a multipath system which has a large number of incremental delays resulting from the different conditions in each of the paths. It necessitates lengthy tapped delay lines with a large number of taps, to compensate for the equally large number of multiple paths. Furthermore, the Rake signals have no significant Doppler spread, and the length of the tapped delay line is significantly shorter than the length of an information bit. As a result, the Rake system is not suitable for use in communication systems where the time and the frequency of the received signal varies greatly.

The journal article "Increased Capacity Using CDMA For Mobile Satellite Communication", by K. S. Gilhousen et al. (IEEE Journal on Selected Areas In Communications, vol. 8, No. 4, May 1990, pages 503–514) describes the performance of a spread-spectrum (SS) Code Division Multiple Access (CDMA) communication system in a mobile satellite environment. These authors mention (page 506) that multiple satellites provide a further method for improving CDMA capacity by combining the coherent signals that are, transmitted between a terminal and all satellites in view.

In U.S. Pat. No. 4,901,307, issued Feb. 13, 1990, entitled "Spread Spectrum Multiple Access Communication System Using Satellite Or Terrestrial Repeaters", K. S. Gilhousen et al. describe a communication system that provides marginal isolation between different user communication signals. The marginal isolation is provided by simultaneously generating multiple steerable beams using a single omni-directional antenna with polarization enhancement. Power control devices are used to adjust the output power, either in accordance with their input activity level, or with a minimum allowable power level for maintaining a communication path. In col. 32 it is stated that satellite or terrestrial based repeaters provide a variety of communication paths which compensate for Doppler Shifts and multi-path problems, to provide an increased reliability of the communication path.

In U.S. Pat. No. 5,233,626, issued Aug. 3, 1993, S. A. Ames discloses a "Repeater Diversity Spread Spectrum Communication System" (incorporated herein by reference in its entirety). This communication system utilizes multi-path spread spectrum radio techniques, and which utilizes at least one linear communications repeater for each of those paths. In this disclosure, the term "linear" as relating to repeaters is defined as a repeater which is powered in such a manner as to provide an output which is within the linear range of all of its components, and will not experience excessive signal distortions within the power range applied to the repeater. In the Ames system, all of the repeaters are normally configured to transmit at their full power even when one of the repeaters is blocked or otherwise unusable. This continuous, full power transmission expends considerable repeater energy, which is of particular concern in satellite based repeaters.

In U.S. Pat. No. 5,093,840, issued Mar. 3, 1992, D. L. Schilling discloses an apparatus for adaptive-power control of a spread-spectrum transmitter of a mobile station operating in a cellular communications network. This adaptive power control only regulates a signal over a single path, and is not applied to more than one path.

In U.S. Pat. No. 5,056,109, issued Oct. 8, 1991, Gilhousen illustrates a multi-path CDMA transmission system, configured for cellular telephones, incorporating a power control system which adjusts the strength of a transmission signal (in cell-site 12), depending upon variation in the signal power. There is only one transmitting antenna which transmits the signal to each cell-site 12, or repeater.

The prior art illustrates a progression of multi-path spread spectrum systems capable of providing increasing levels of signal transmission quality. However, none of the above systems utilizes a multi-path spread spectrum system which also provides a mechanism to limit future transmissions of signal copies over a particular communication path based on signal quality.

One of the prime considerations in satellite applications is energy expenditure and conservation. If a multiple communication path system (the term "communication path" is defined in this disclosure as a combination of a first transceiver, a second transceiver, and at least one repeater) could be constructed that consumes less average overall energy while transmitted data with equivalent reliability, then smaller and/or lighter repeaters could be utilized, which would result in smaller and/or lighter satellites.

SUMMARY OF THE INVENTION

This invention relates to a multi-path device which includes a plurality of communication paths being defined between a plurality of first transceivers and at least one second transceiver. Each communication path contains at least one repeater. Each signal transmission from the first transceiver to the second transceiver contains an identifiable copy of an identical signal, one signal copy is transmitted over each of a plurality of communication paths. There is a signal quality determining portion associated with the second transceiver for determining the quality of the signal copy received by the second transceiver via each of said communication paths. There is a return signal which is transmitted from the second transceiver to each of the first transceivers, over the communication path, which contains information relating to the signal quality of each of the signal copies. A communication path limiting portion controls the future signal transmissions along each of the plurality of communication paths based upon said signal quality determining portion. It is envisioned that this device may use a CDMA communication protocol.

In the present invention, even though the signal copies sent through each of the communication paths from the first transceiver to the second transceiver contains identical digital information, each transmitter of the first transceiver portion utilizes a distinct overlaying PN code associated with each communication path. In this manner, when the second transceiver receives a particular signal copy, the second transceiver can identify the communication path which transmitted the signal copy. Each first transceiver transmits and receives its signals in a focused area in space where the corresponding repeater is the only repeater. The plurality of communication paths utilize linear communication repeaters. If any one of the signal copies originating from any of the transmitters of the first transceiver passes through its respective repeater to the receiver of the second transceiver, then the signal will be considered to have been sent.

The second transceiver has an omni-direction antenna, and transmits an identical return signal to each of the first transceivers providing information of which first transceivers are transmitting signal copies of the highest quality. If one or more of the return signal from the second transceiver gets through to the first transceiver, then a controller associated with the first transceiver can control the desired operation of the first transceiver. This is accomplished in accordance with this invention by utilizing those paths which are capable of transmitting their signal most effectively while, at the same time, limiting the transmission of signals over those paths which are partially or entirely blocked from transmitting a signal to the second transceiver.

BRIEF DESCRIPTION OF THE DRAWING

The features of the invention are made more apparent in the ensuing Detailed Description of the Invention when read in conjunction with the attached Drawings, wherein:

FIG. 1a is a schematic depiction of a transmission through one embodiment of the repeater diversity communication system of the present invention. The transmission of multiple identifiable, identical but identifiable signal copies travels from (n) independent transmitter portions of the first transceiver 1a, 1b, 1n, and pass through (n) independent communication paths each of which include a repeater to a single receiver portion 7r of the second transceiver 7;

In FIG. 1b, the repeaters 3, 4, 5 are illustrated as rotated about a vertical axis (not illustrated) as compared to FIG. 1a for simplicity of illustration of the communication paths;

FIG. 2 is a block diagram of a first embodiment of a receiver portion 7r of the second transceiver 7 illustrated in FIG. 1a;

FIG. 7b illustrates a sequence of arrival of the symbols depicted in FIG. 7a.

DETAILED DESCRIPTION OF THE INVENTION

A description of this invention is now made with respect to FIGS. 1A, 1B, 2–6, 7A and 7B. It is pointed out that FIGS. 2–6, 7A and 7B are substantially identical to FIGS. 2–6, 7A and 7B of the above identified U.S. Pat. No. 5,233,626 by Stephen A. Ames (incorporated by reference herein in its entirety).

Figure 1B:
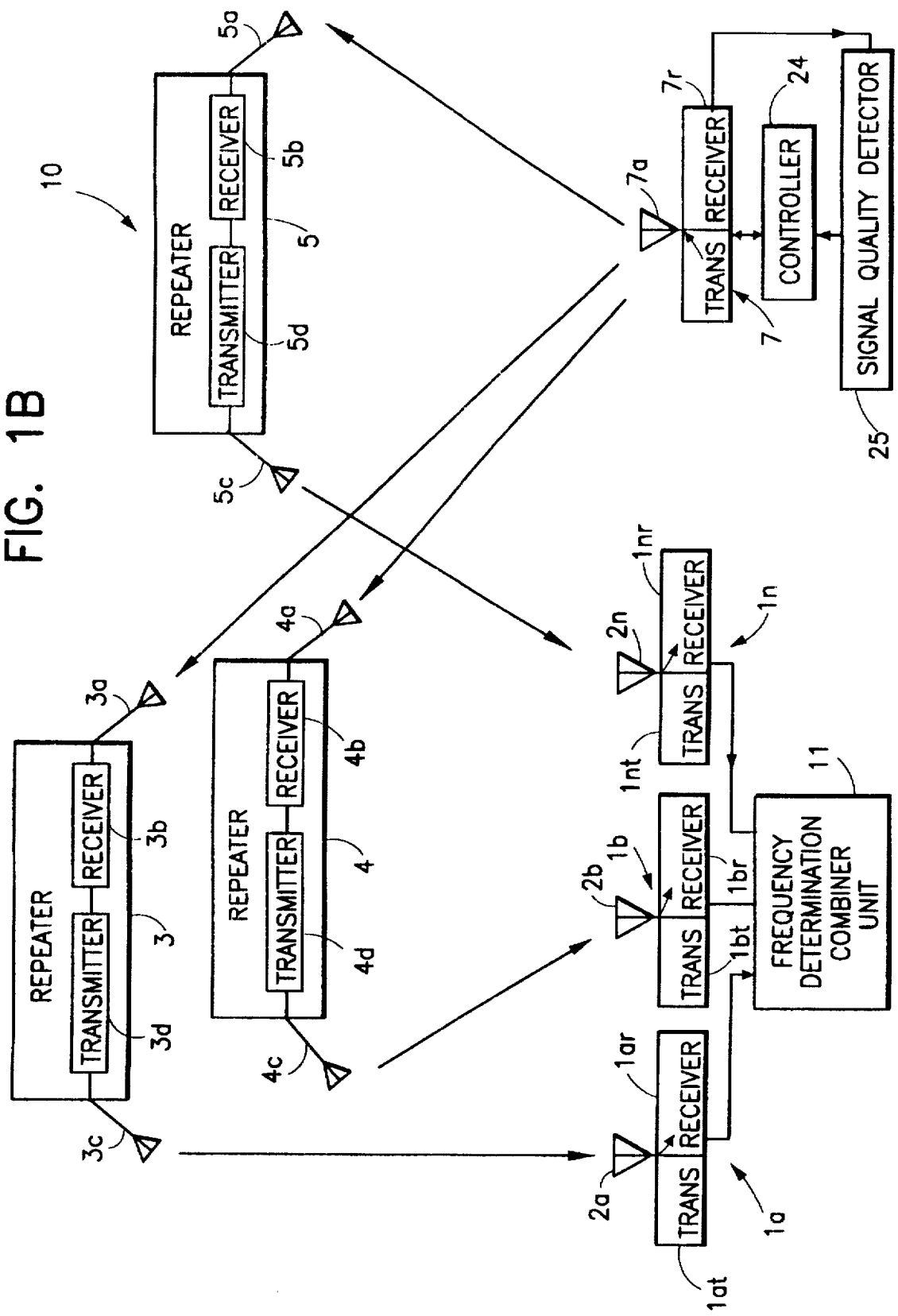
FIG. 1b is a similar schematic depiction to FIG. 1a, except that the transmission passes from the transmitter portion 7t of the second transceiver 7: through (n) independent communication paths to (n) independent receiver portions of the first transceiver 1a,1b, 1n.

FIGS. 1a and 1b schematically illustrate an embodiment of a communication system 10 that is constructed and operated in accordance with this invention. A frequency determination/combiner unit 11 applies an identical signal copy to each of a plurality of first transceivers 1a, 1b and 1n. Each of the first transceivers are connected to an associated uni-directional antenna 2a, 2b, 2n in a known manner. Each first transceiver/antenna combination 1a, 2a; 1b, 2b; 1n, 2n applies an overlapping PN code to the identical signal copy, such that each signal copy can be identified as it is transmitted over one of a plurality of respective communication paths defined by respective repeaters 3, 4, 5 and a single second transceiver portion 7. The term "communication path" is defined in this disclosure as a combination of a first transceiver, a second transceiver, and at least one repeater.

Each repeater 3, 4 and 5 includes a receiving antenna 3a, 4a, 5a respectively coupled to a receiver 3b, 4b, 5b; and a respective transmitter 3d, 4d, 5d, respectively coupled to a respective transmitting antenna 3c, 4c, 5c. For example, the repeater 3 has the receiving antenna 3a, the receiver 3b, the transmitter 3d, and the transmitting antenna 3c. It is preferable that the repeaters are substantially linear such that the greater the signal strength applied to the receiving antenna 3a, 4a, 4a; the greater the corresponding signal strength applied to the respective transmitting antenna 3c, 4c,5c (and little distortion will occur throughout the utilized power range of the repeaters.) While only one repeater is illustrated in FIGS. 1a and 1b as being contained within each communication path, it is to be understood that a particular communication path may incorporate more than one repeater. It should be realized that although three repeaters are shown in FIGS. 1a and 1b, that more or less than this number may be employed.

Each repeater typically consumes more power as it repeats a greater number of signal copies, or amplifies a particular signal copy which has a greater input power. For this reason, it is desired that each repeater repeat a minimum number of signal copies and/or limit the amplification of as many signal copies as possible. This invention accomplishes this goal by limiting the transmission of copies of duplicative messages (i.e. when other signal copies of a superior quality are being adequately transmitted over other communication paths).

By example only, the repeater 5 is terrestrially based while the repeaters 3 and 4 are mounted upon satellite platforms. Repeaters 3, 4, 5 each receive their copy of the transmission from the first transceivers 1a, 1b and 1n, respectively, and retransmit the received signal to a second transceiver 7. The second transceiver 7 includes an omnidirectional antenna 7a (it can receive a signal from and/or transmit a signal to any satellite which is within the line of sight of the antenna, depending upon signal strength, atmospheric conditions, etc.) As indicated in FIGS. 1a and 1b, the respective path lengths to and from each of the repeater transmitting antennas to the antennae 7a is different. As a result, a variable multi-path condition is induced into the signals received at the antenna 7a. Part of the present invention is related to equalizing the multi-path condition such that if the signals copies are combined after the second transceiver, the timing of the signals travelling over each of the communication paths will be identical.

Even though the contents of the signals being transmitted using CDMA through the different repeaters are identical when many copies of the same signal are being sent, each copy contains the distinct overlying PN code which can be, detected by the second transceiver 7. The transmitting antennas 2a, 2b, 2n are uni-directional such that only one repeater will receive a signal copy from each first transceiver 1a, 1b, 1n. The second transceiver can detect signal quality for each signal copy such that a controller 24, which is associated with the second transceiver 7, can determine the signal quality of each communication path from the first transceiver to the second transceiver 7. The controller 24 is typically microprocessor or microcomputer based, although any type of device which can respond with sufficient speed may be used.

Figure 2:
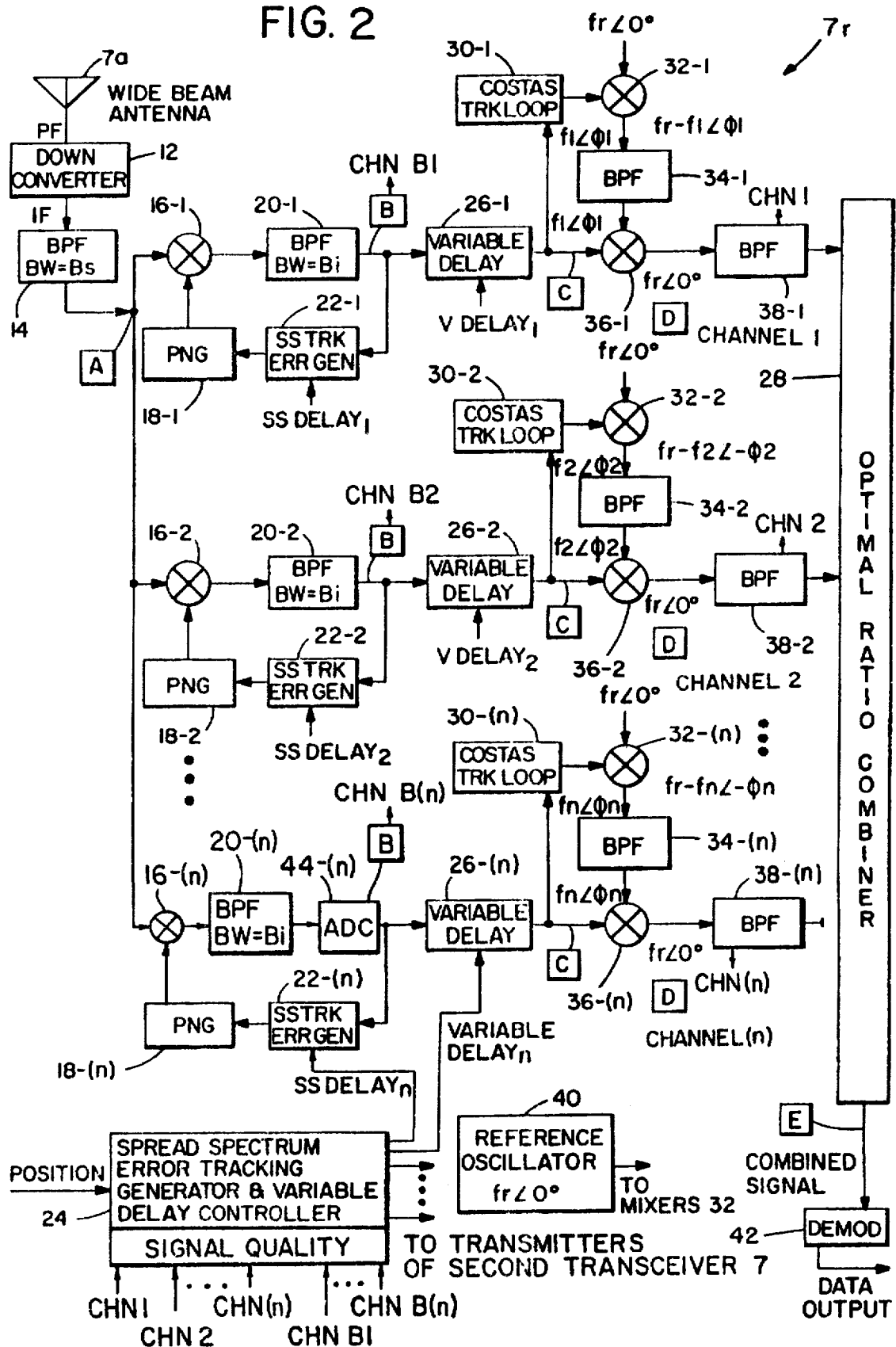

The signal quality of each signal copy, which is sent from said first transceiver via the repeater to the second transceiver, is determined by a signal quality detector 25 which utilizes well known techniques such as Bit Error Rate (BER) and Signal To Noise Ratio (SNR) to determine the quality of the signal. If BER is used, the quality of the signal may be derived from the BFPs 38-1, 38-2, 38-(n) from FIG. 2 over channels CHN1, CHN2, CHN(n) by comparing the received signal to an error code which is transmitted along with the signal (as is known in the art). If SNR is used to determine the signal quality, the signal quality detector 25 can derive its input from node B as illustrated in FIG. 2 using any or all of the channels CHNB1, CHNB2, CHNB(n) by comparing the percentage of the signal strength which is composed of the signal compared to the signal strength which is composed of noise (in a manner known in the art). It is generally accepted that such signal quality indicators as BER and SNR are related. Any other suitable signal quality indicator may be substituted for the SNR and the BER, as described above.

The second transceiver 7 utilizes the omni-directional antenna 7a which is capable of receiving signal copies from, or transmitting signal copies to, all the repeaters located within a reasonable proximity thereto. The controller 24 associated with the second transceiver will send a return signal out to all of the repeaters 3, 4, 5 providing information about which of the first transceivers should continue transmitting based upon the received signal quality. This return signal also contains an overlaying PN code which will transmit an identical signal copy, with an identical header, over each communication path to all of the first transceivers. The return signal will be forwarded to the frequency determination/combiner unit 11. The return signal contains information relating to the signal quality of each of the communication paths (as determined from the forward signal over each communication path.) The frequency determination/combiner unit 11 regulates further signal transmissions from the first transceivers to the second transceiver depending upon the identified signal quality of each communication path. This process is preferably repeated and updated several hundred times a second, since signal qualities between different communication paths can vary rapidly, such that the frequency determination/combiner unit 11 is constantly aware of the signal qualities of each communication path.

The first transceivers 1a, 1b, 1n each comprise respective transmitter portions 1at, 1bt, 1nt; and respective receiver portions 1ar, 1br, 1nr. The second transceiver 7 similarly comprise a receiver portion 7r and a transmitter portion 7t. The first transceivers 1a, 1b and 1n, and the second transceiver operate in full duplex. As such, one or more of the first transceivers 1a, 1b, 1n and the second transceivers 7 can communicate simultaneously in both directions over the same communication paths. It is also possible that half duplex communication techniques may be applied to the present invention.

When a signal copy is being transmitted from each of the first transceivers 1a, 1b, 1n to the second transceiver 7 as illustrated in FIG. 1a (or alternately from the second transceiver 7 to each of the first transceivers 1a, 1b, 1n, as in FIG. 1b), respective repeaters 3, 4, and 5 are used. Any signal which is retransmitted via repeaters 3, 4, and 5 will be received initially by the respective receiver antenna 3a, 4a, 5a and the respective receivers 3b, 4b, 5b; the repeaters then amplifies and transmits the signal over the respective transmitter portions 3d, 4d, 5d and the respective transmitter antenna 3c, 4c, 5c. The orientation of the components 3a–3d, 4a–4d, 5a–5d at FIG. 1a are rotated about a vertical axis (not illustrated) as compared to FIG. 1b for ease of display of the communication paths.

The first transceivers 1a, 1b and in shown in FIGS. 1a and 1b may be of any conventional spread spectrum (hereafter referred to as SS) type, and preferably utilizes CDMA. SS communication customarily involves processing the narrow band outgoing information signal with a spreading function into a broad bandwidth signal. This is a reproducible function which spreads the narrow bandwidth transmission signal over a broader bandwidth while simultaneously reducing the peak spectral density of the signal. This is known as direct sequence spread spectrum coding. Alternatively, the carrier frequency may be pseudo-randomly hopped over the spread bandwidth. Direct sequence spread spectrum systems are preferred for applications that address multi-path impairments.

It is noted that while this invention is described in the context of a spread spectrum communication system, many teachings of this invention can also be extended to other types of communications systems wherein a plurality of repeaters are utilized to forward a signal from a transmitter to a receiver.

In the first transceivers 1a, 1b and 1n the spreading function can be accomplished, for example, by converting the analog input information signals, such as voice, into a digital form and then multiplying the signals by a high bandwidth, high frequency digital spreading signal. Digital, as opposed to analog, input signals can be directly spread. The resulting spread spectrum signal is then used to modulate a carrier and create a communication signal. The resulting high bandwidth spread signal is composed of a deterministic series of bits of period $T_c$, referred to herein as chips. The chips are generated using electronic apparatus and techniques known to those skilled in the art. There are a variety of techniques, as well as known coding formulas, for generating spread spectrum chip sequences.

In general, the chips are generated at significantly higher frequencies than the input voice or data signals. By generating the chips at a higher frequencies, a series of chips are generated for every signal information bit. The specific chip frequency that is employed is a function of the bandwidth allocated for that particular communication system. It is desirable to spread the communication signal to cover the entire allocated bandwidth, where possible.

Receiver Portion of the Second transceiver

Referring now to FIG. 2, the receiver portion 7r of the second transceiver 7 (FIG. 1a), the controller 24, and the signal quality detector 25 are illustrated in block diagram form. The receiver portion 7r operates to process the received repeater diversity signals and includes (n) identical processing or communication paths, one path being provided for each repeater within the field of view of the wide beam antenna 7a; even though a repeater can be associated with more than one first transceiver, and as such, the repeater may be considered as being located within more than one communication paths. The wide beam antenna 7a is directed to be capable at communicating with any antenna 3c, 4c,5c of the respective repeater 3, 4, 5 within a wide expanse of sky. By comparison, the antennas 2a, 2b, 2n of the respective first transceivers 1a, 1b, 1n are each focused on one particular respective antenna 3a, 4a, 5a, associated with respective repeaters 3, 4 and 5. It is noted that the status of which one of the repeaters are in view of the antenna 7a can change very quickly as the relative positions of the transmitting and/or receiving antennas in the first transceivers, the repeater and/or the second transceiver alter; or when objects move between the above antennas; when the distances between the antennas change, or when the atmospheric conditions change.

Before describing in detail the repeater transmitter power control functions that are an aspect of this invention, a description will first be given for presently preferred embodiments of the receiver circuitry 7r that is embodied within the second transceiver 7. The receiver circuitry 7r is constructed and operated in accordance with the teaching found in U.S. Pat. No. 5,233,626, which has been incorporated by reference herein in its entirety.

In general, the receiver portion 7r of the second transceiver 7 includes circuitry for correlating the (n) multiple transmissions of the same signal that arrive via the different repeaters 3, 4, 5, and which were originally transmitted from the first transceivers 1a, 1b and 1n. As will be described in detail below, the receiver portion 7r includes circuitry for performing, in sequence, an SS correlation, equalizing all received signal delay paths to a maximum received delay. All Doppler frequency offsets are to equalized zero, and all phase shifts are equalized to zero. All received signals are combined and an optimal demodulation of the combined signals is provided.

Figure 7A:
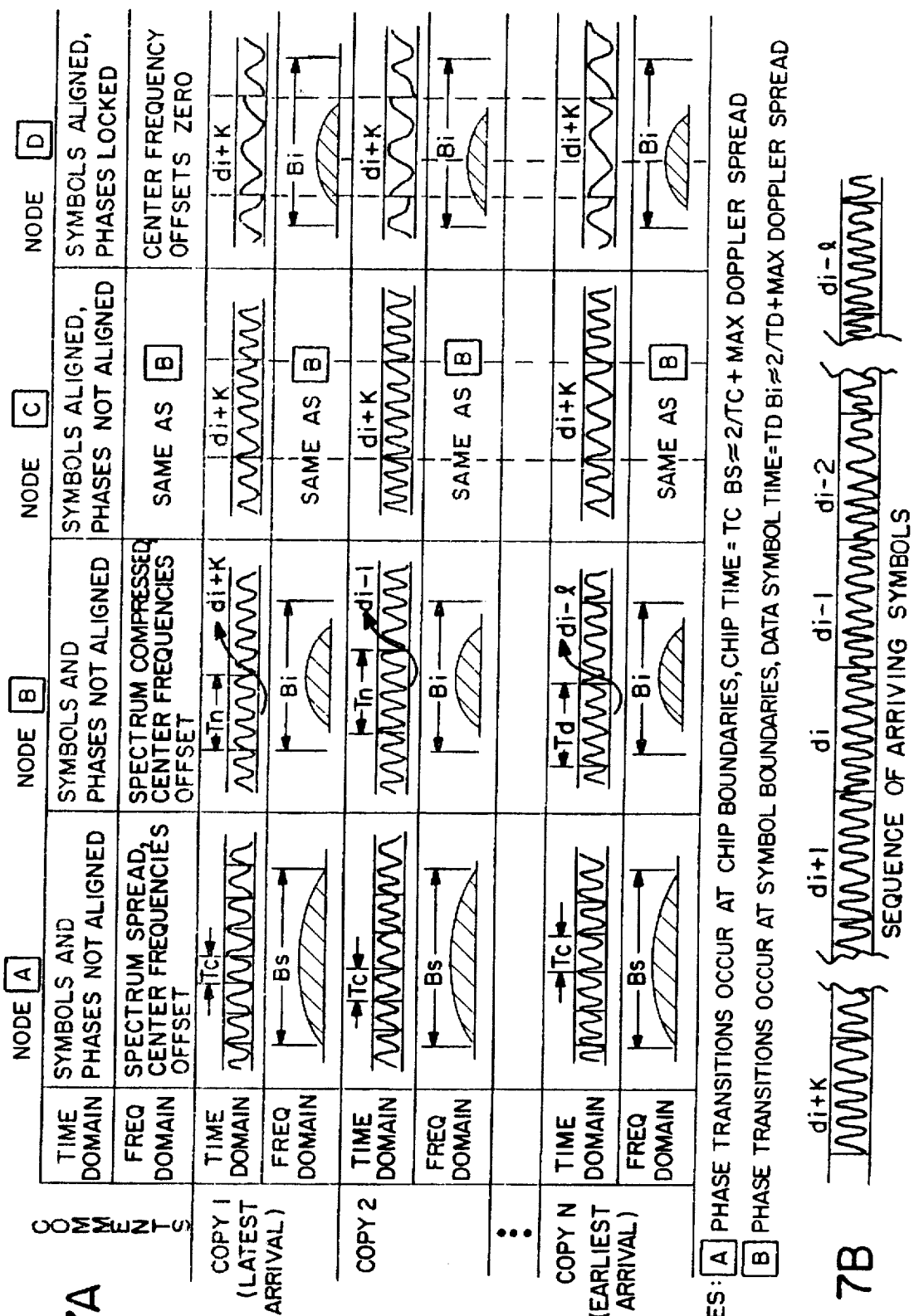
FIG. 7a illustrates both frequency domain and time domain signals appearing at the nodes A, B, C, and D of FIG. 2.
Figure 7B:
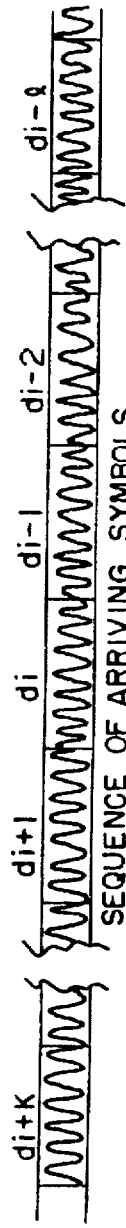

The following description of the operation of the circuitry shown in FIG. 2 is intended to be read in conjunction with the signal diagrams of FIGS. 7a and 7b. In FIG. 7a the nodes labeled A, B, C, and D correspond to the like-designated nodes in FIG. 2. It should be noted that the relative spectral bandwidth of Bs and Bi in FIG. 7a is shown for graphical convenience. In practice:

$1.000 \leq Bs/Bi \leq 100.000$, which implies $1.000 \leq Td/Tc \leq 100.000$, wherein Td is the data bit period and Tc is the chip period. In FIG. 2, the receiver portion 7r includes a down converter 12 that converts the input SS signal plus interference and noise, from radio frequency (RF) to an intermediate frequency (IF). A bandpass filter 14 filters the IF signal to a bandwidth Bs that is equal to the SS band width plus the maximum and minimum Doppler shifts. At the node labeled A the composite signals are applied to (n) mixers 16. For each of the receiver processing channels (channel 1, channel 2, channel n), there is provided an associated mixer 16-1, 16-2, . . . 16-(n), respectively.

In that receiver channels 1-(n) are substantially identical to one another, the remaining discussion will be made in reference to receiver channel 1, it being realized that the discussion applies equally to all receiver channels.

The mixer 16-1 is driven by a pseudorandom noise generator (PNG) 18-1. The mixing product that is output from the mixer 16-1 is applied to an IF bandpass filter 20-1 of bandwidth Bi, where Bi is the bandwidth of the signal modulated with data, plus the maximum and minimum Doppler shifts. A spread spectrum tracking error generator 22-1 has an input coupled to the output of the bandpass filter 20-1. The output of the bandpass filter 20-1 is indicated by the node B. After the spread spectrum tracking error generator 22-1 has acquired and tracked the received signal, the signal is compressed in bandwidth, at the output of the IF bandpass filter 20-1, to the intelligence conveyed by the signal plus the Doppler bandwidth (Bi).

For direct sequence SS, the SS tracking error generator 22-1 is implemented by a delay-locked detector. A delay-locked detector is a known device that functions by subtracting a correlation function, in an early correlation of the received signal with a local reference pilot sequence, from a correlation function in a late correlation of the received signal with the local pilot reference sequence. If there is no time tracking error, the resultant difference is zero. If the local reference leads the correct timing, a negative difference signal is produced; conversely, if the local reference lags the correct timing, a positive difference signal results.

For a fast frequency hopping (FFH) embodiment, the SS tracking error generator 22-1 and the PNG 18-1, are replaced by a synchronized Frequency Hopping (FH) synthesizer that produces the same bandwidth compression as the direct sequence SS technique illustrated in FIG. 2. For the fully coherent case, the SS tracking error generator 22-1 receives a control signal from a spread spectrum error tracking generator and variable delay controller 24. The control signal specifies an amount of expected delay for the signal being processed by that channel and is employed as an aid in delay locking the channel to the signal received from one of the (n) repeater paths illustrated in FIG. 1a.

One function of the controller 24 is to cause each of the (n) SS tracking error generators 22 to acquire a distinct copy of one of the (n) SS signals that are received from the repeaters 3, 4, 5 of FIG. 1a. As an example, the controller 24 operates to cause channel 1 to acquire and track the signal having the largest delay, channel 2 to acquire and track the signal having the next largest delay, and so forth. As a result, channel (n) acquires and tracks the received signal having the least delay. This channel acquisition technique is preferred in that, if two or more of the channels were to acquire and track the same copy of the signal, the signal fades would no longer be independent, thereby reducing the fade resistance of the resulting summed signal.

Another function of the controller 24 is to estimate, to an accuracy of a fraction of an SS chip time, the delay between the ith SS code signal copy and the maximum delayed code signal copy. When this is achieved, the controller 24 adjusts each different delay 26-1 to 26-(n) such that all signals emerging at node C are equalized to the received signal that has the maximum delay. In order to achieve these functions, and in accordance with the logic flow diagram of FIG. 5, the controller 24 is provided with an estimate of the position of the receiver portion 7r (Block A—FIG. 5. By example, if the receiver portion 7r is located on a mobile platform, the position estimate may be generated by an inertial navigation unit. The controller 24 also has prior knowledge of the positions of each repeater 3, 4, 5 of FIGS. 1a and 1b. Based on the knowledge of the position of the receiver portion 7r and the positions of repeaters 3, 4, 5; the controller 24 estimates the path length, and hence the expected phase shift of the signal, between each repeater and the receiver portion 7r (Block B—FIG. 5). The expected phase delays are provided to the respective SS tracking error generators 22-1 to 22-(n) so that each SS tracking error generator 22 can be initially set to be at or near the expected phase delay of the received signals.

Figure 5:
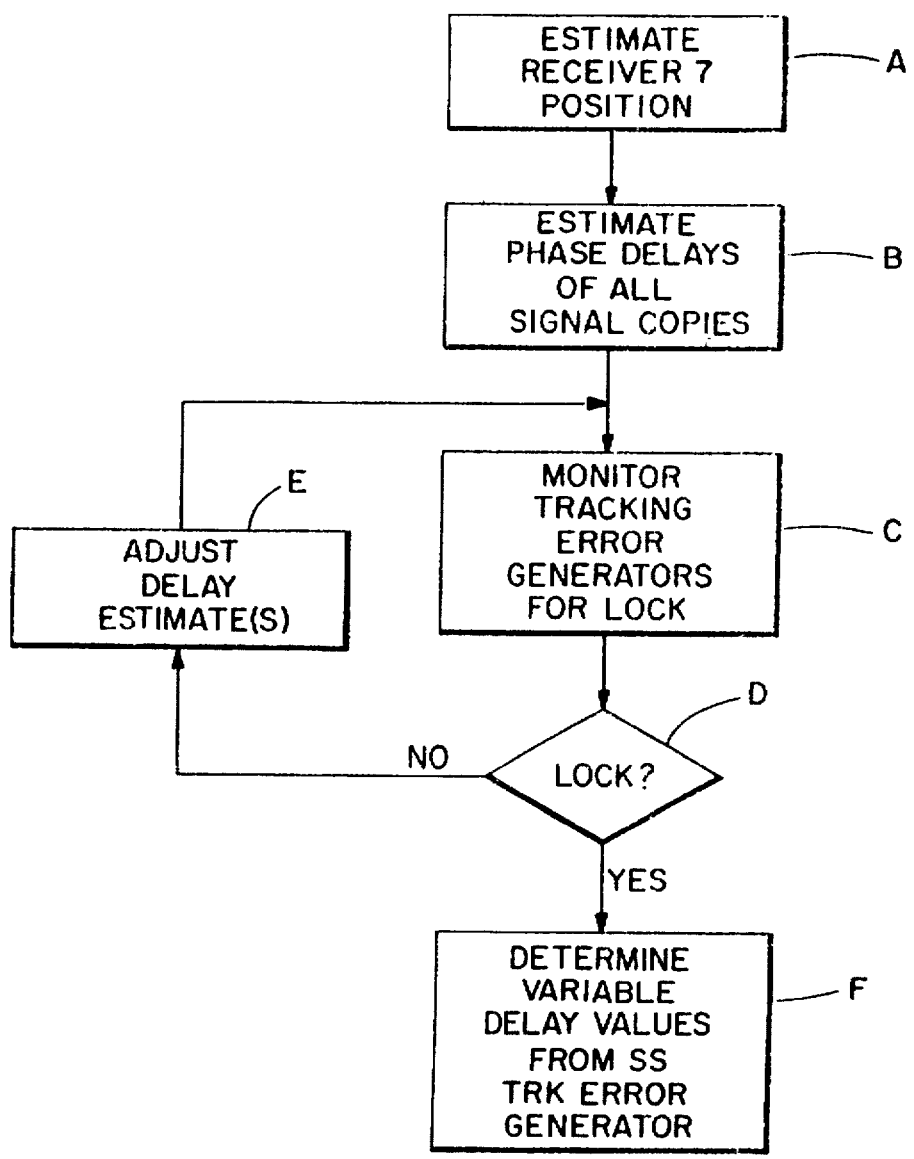
FIG. 5 is a logic flow diagram illustrating the operation of an SS error tracking generator and a variable delay controller.

At Block C—FIG. 5 the controller 24 monitors each of the SS tracking error generators 22 to determine if the associated tracking loop has achieved lock. After a predetermined integration time the controller adjusts the SS Delay signal upward or downward for those tracking loops that have not achieved lock (Blocks D & E—FIG. 5), integrates for an interval, and senses for lock (Block C—FIG. 5). The search for lock (loop) may continue indefinitely according to a search plan programmed into the controller 24. No output signal is added into an optimal ratio combiner 28, as described below, unless and until lock and full equalization is achieved on that signal.

Figure 6:
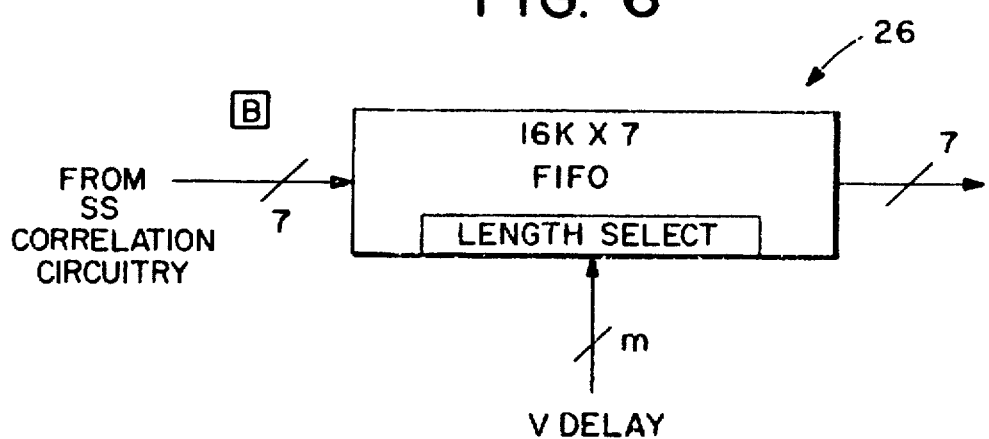
FIG. 6 is a block diagram showing a presently preferred embodiment of a variable delay device.
Figure 4:
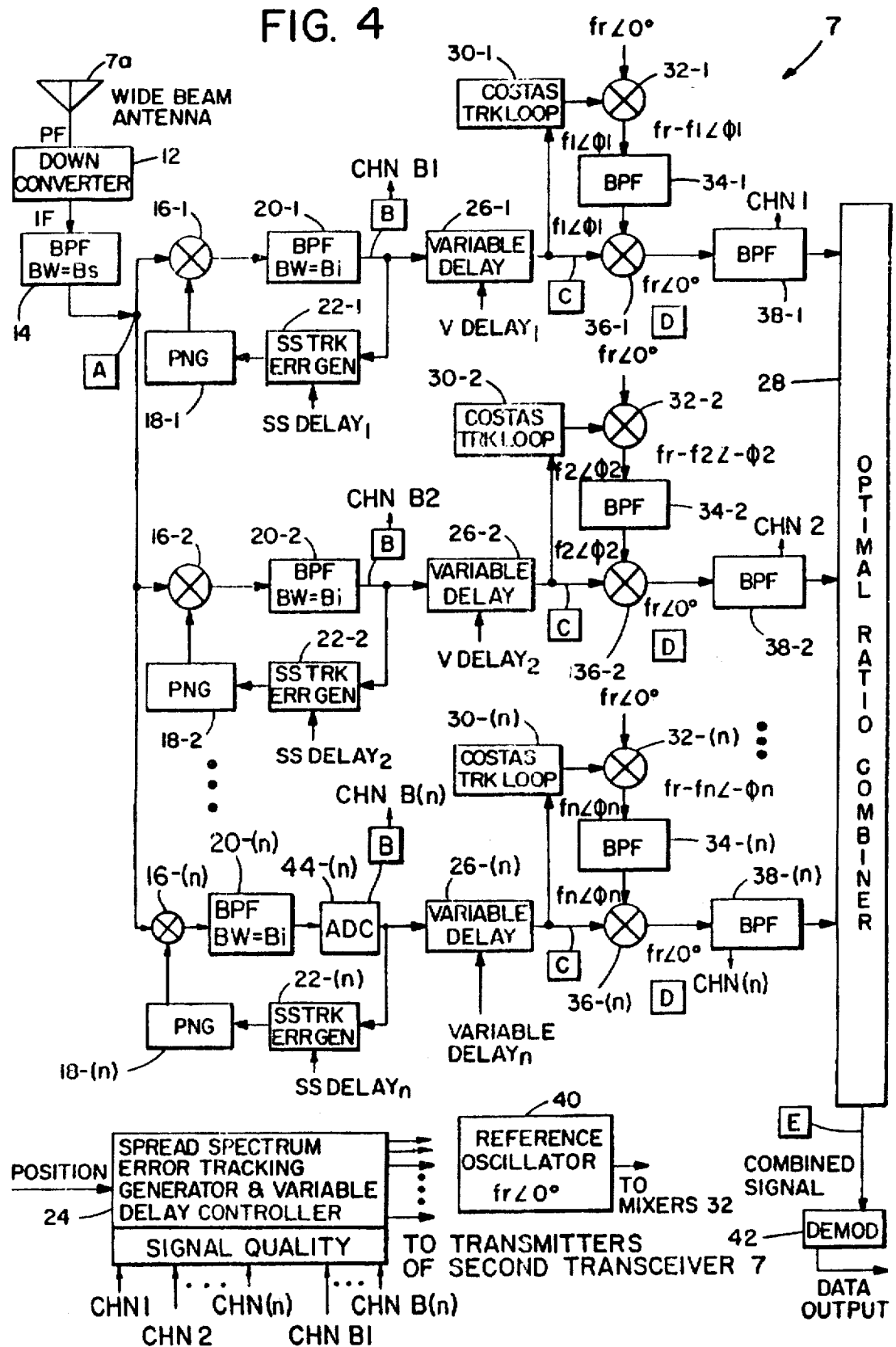
FIG. 4 is a block diagram of a second embodiment of a repeater diversity receiver for fully coherent detection, this embodiment is implemented with digital signal processors and discrete analog circuitry.

After achieving lock with each channel, the controller 24 determines at Block F—FIG. 5 a variable delay (VDELAY) for each of the associated variable delay blocks 26-1 to 26-(n), based on the SS Delay signal values. The VDELAY signals are employed to select a length of a FIFO buffer such that the digitized carrier-modulated signal stored within each are adjusted in time to within a fraction of a data bit at the output of the variable delay blocks 26-1 to 26-(n). Thus, in a presently preferred embodiment of the invention each of the blocks labelled variable delay 26-1 to 26-(n) is preferably implemented as a variable length, first in/first out (FIFO) buffer, as is shown in FIG. 6.

It should be noted that for a system that employs non-coherent demodulation, the demodulation may be performed at ode C, where the path delays are all equalized, and without the additional processing shown between nodes C and D in FIG. 2. If differentially coherent demodulation is performed, the Doppler shifts of the copies of the signal are required to be removed, although phase equalization is generally unnecessary.

In FIG. 2 the (n) copies of the signal are phase locked at the input to an optimal ratio combiner 28. This is achieved by splitting the delay equalized signals at node C into two signal paths. A first path includes a Costas-type tracking loop 30-1 which extracts from the channel signal a suppressed carrier component of frequency fi and a phase angle-modulated signal stored which is adjusted in time to within a fraction of a data bit rate. At the output, the variable frequency fr and phase angle 0° is supplied from a reference oscillator 40. The difference term output from mixer 32-1 is applied to a bandpass filter 34-1; the output is the frequency difference (fr—fi) when a phase angle of —φ is realized. This discussion applies equally when mixer 36-1 is in the second of the two paths of the delayed equalized signal at node C. The operation of a Costas loop is described in "Digital Communications by Satellite", by J. J. Spilker, Jr. at pages 303–310 (Prentice-Hall, Inc., Englewood Cliffs, N.J.); which is incorporated herein by reference.

As a result of this signal processing technique all signal copies at nodes D carry the associated channel's intelligence modulation on a carrier signal which has a carrier frequency at fr and a phase angle 0°. The signal t node D is applied to a bandpass filter 38-1 which passes only the sum frequency term fr. As a result, the signals that are input to the optimal ratio combiner 28 from each of the channels, 1-(n) are all equalized to one another in delay, frequency, and phase shift. Thus, at the input to the optimal ratio combiner 28 only the amplitudes of the input signals from channels 1-(n) differ.

The optimal ratio combiner 28 operates to weigh each signal component proportional to its strength and to form a sum signal at an output. The output of the optimal ratio combiner is the node E which forms the input to a demodulator 42. In operation, the optimal ratio combiner 28 functions to cause stronger signals of larger amplitudes, and therefore of larger SNR, to constitute a proportionately larger component of the output signal at node E than the weaker signals.

The demodulator 42 is of a type that is appropriate for whatever modulation technique underlies the SS signal. For example, if the data modulation is MPSK, then the demodulator 42 is a coherent MPSK type. If differentially coherent demodulation is employed, the demodulation is performed after the Doppler equalization at node D, in which case the optimal ratio combiner 22 is employed at baseband and the demodulator 42 can be eliminated. A similar case is presented if the data modulation is non-coherent FSK.

Figure 3:
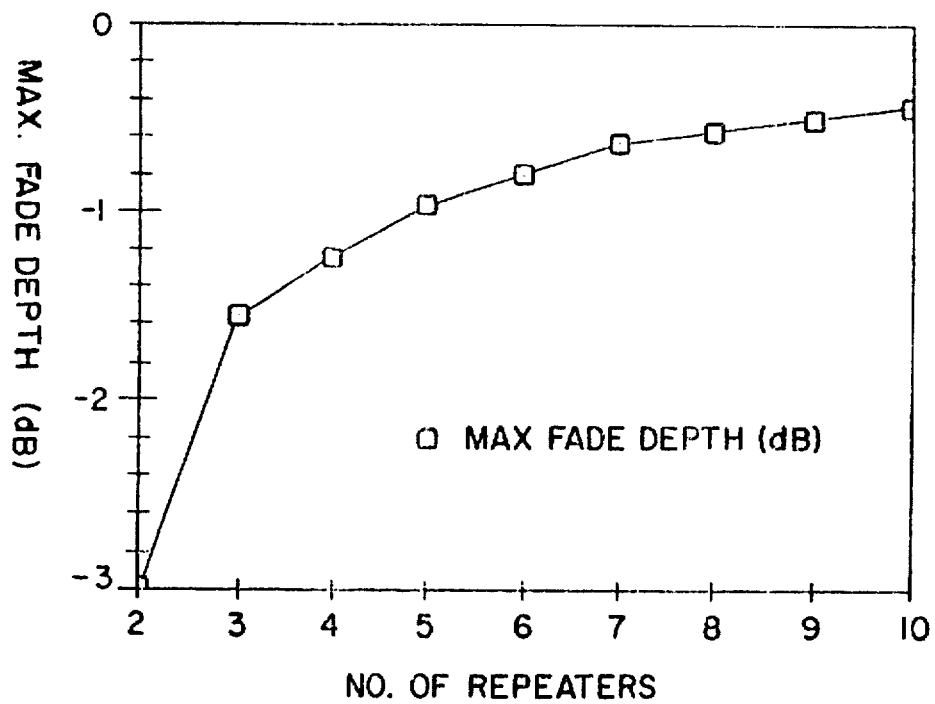
FIG. 3 is graph illustrating a maximum fade depth, in dB, as a function of the number (n) of active repeaters and showing how the loss of a single repeater, when there are only a few "good" or "fair" repeaters, can cause a substantial reduction on signal strength (fade)

A significant performance enhancement is gained when compared to single repeater systems. A single repeater system suffers a fade depth equal to the fade depth of the single transmission path. However, for an nth order diversity system, with equal strength repeater paths as described above, the combined signal strength over the single channel system is (n). Thus, if L of the repeater paths of FIG. 1A drops out completely, the fade depth of the diversity receiver system 10 is approximated by the equation:

$$\text{fade depth}(dB) = 10 \log(n - L/n). \tag{1}$$

which is plotted in FIG. 3 for cases of greatest interest, that is for $L \leq 10$. As can be seen, for a two repeater system a complete fade out of one of the signals results in only a three dB system fade. However, for a single repeater system the loss of the single repeater would result in a 100% outage. For the case of five repeaters, a complete drop out of one repeater signal produces only a one dB fade in the combined signal, which is insignificant for many applications.

At relatively low data rates, such as 4.8 KBPS (4,800 bits per second), such as used for coded voice in mobile satellite communications, a significant portion of the receiver portion 7r shown in FIG. 2 may use digital signal processing (DSP) techniques. For the DSP embodiment of FIG. 4 the down converter 12, bandpass filter 14, mixers 16-1 to 16-(n), and the bandpass filters 20-1 to 20-(n) are preferably implemented with analog elements. The remaining blocks can use digital signal processors, with preferably one DSP being used for each channel 1-(n). Also, for the DSP embodiment of FIG. 4 an analog to digital converter (ADC) 44 is provided for each channel to convert the output of the bandpass filter 20 to a digital signal. An analog to digital converter having seven bits of resolution is sufficient for IF sampling of most communication signals. The digital variable delay buffer 26-1 to 26-(n) may be implemented with a 16K×7 bit FIFO having a write access time of less than 2.8 microseconds. In order to minimize the sampling rate, and enhance the computational load, complex signal processing is preferably employed throughout the digital circuitry.

As was previously noted, the variable delay 26-1 to 26-(n) is preferably implemented as a variable length FIFO buffer. The maximum size of the FIFO buffer can be determined from a maximum differential delay between the diversity paths and the time between samples. That is, the maximum FIFO buffer length is equal to the maximum differential delay divided by the ADC 44 sample interval.

By example, for repeaters on geostationary satellites the maximum differential path delay is approximately 36.6 milliseconds. The nominal bandwidth of the post-correlation bandpass filter is 11 kHz. A minimum Nyquist sampling rate is two times Bi. However, to produce high accuracy delay equalization between the channels, a sampling rate of 32×Bi is preferably employed. This results in the ADC 44 operating at approximately 350,000 samples per second. As a result, the maximum FIFO buffer length is equal to 36.6 milliseconds×350 kHz or, 12,810 samples. Thus, the 16K×7 bit FIFO is more than adequate to store the sampled signal for each channel.

Having thus described the presently preferred embodiment for the receiver circuitry 7r, the ensuing description details the teaching of this invention as it applies to signal quality monitoring and control of the transmissions form the first transceivers 1a, 1b, 1(n)

Signal Transmission.

It is first noted that one of the communication paths of FIG. 1a, using repeater 3, for example, may be mostly blocked while the communication paths associated with repeaters 4 and 5 may be clear. The antennas 2a, 2b, 2n of the transceivers 1a, 1b, 1n, are each configured to send copies of the same coded message to the repeaters 3, 4, 5. The antennas 2a, 2b, 2n are positioned such that at any given time, the probability of all of the antennas forming a weak communication path is very small. This also provides a high probability that at any given time, two, three, or considerably more first transceivers will be transmitting an identical copy of the same message at the beginning of each cycle to determine signal quality of the signals transmitted from each first transceiver 1a, 1b, 1n.

In FIGS. 1a and 1b, during the initial periods of each signal quality determination cycle (the cycles preferably occur hundreds of times per second), repeaters 3, 4, and 5 are transmitting under full power regardless of the quality of the signal copies being received by the receiver portion 7r of the second transceiver 7 (i.e. the number of identical copies being transmitted). In view of the difficulty and expense of supplying power to many satellite based repeaters (where energy is an extremely valuable commodity), the benefit of limiting the number of transmissions of identical signal copies through many repeaters can be appreciated.

This following description pertains to the repeater transmitter power control function that is based upon the quality of the signal received by the receiver portion 7r of the second transceiver 7. Each of the signal copies being transmitted through each of the communication paths of FIG. 1a is transmitted with a certain determinable signal quality. The respective signal qualities of the signal copies transmitted over the different communication paths can be determined using several techniques. Thus, if a signal is received in the receiver portion 7r with a considerably lower signal quality then expected, it can be concluded that the corresponding communication path is at least partially blocked, or else some other transmitting condition(s) (distances, medium, etc.) is poor.

It should be emphasized that the signal quality of the signal copies associated with various communication paths can change extremely quickly (for example, within a few milliseconds). Therefore, the sampling of the signals is performed at an equivalent rate to ensure acceptable monitoring of the communication paths. Poor signal quality of communication paths can be caused by, for example, atmosphere conditions and/or trees, buildings, etc. becoming positioned between the antennas of the first and second transceivers, and one of the repeaters 3, 4, and 5, and/or by excessive distances therebetween.

In this disclosure, the term "signal quality" refers generally to the capability of the transmitted signal to be received and properly interpreted by the receiver. There are several measurable indicators which may be utilized for signal quality. One measurable indicator is Bit Error Rate (BER) which measures how many errors are being received by the receiver as determined by some well known code techniques is derived over the combination of channels CHN1, CHN2, and CHN(n) of FIG. 2. Another measurable indicator is carrier to noise ratio which measures the value of the total signal which is being contributed to by the carrier and transmitted signals (with the remainder being noise) divided by the noise value. The SNR is derived over any one of the channels CHNB1, CHNB2, or CHNB(n) of FIG. 2. An assumption is made that if the carrier to noise ratio for a given signal is high, then the BER should be relatively low. In such a manner, different signal quality indicators are often interrelated. A third measurement which relates to signal quality are correlation measurements, which measure the quality of the CDMA signal. The above measures of signal quality are intended to be illustrative in nature while not limiting in scope. Any other well known type of signal quality measurement may be utilized and still be within the scope of the present invention.

The controller 24 illustrated in FIGS. 1a and 1b monitors the signal quality being received from all of the communication paths of FIG. 1a. In this manner, the controller 24 determines which signals are received at the different signal qualities (poor, fair, or good, as defined below). A purpose of the controller 24 is to maintain transmission of signal copies that are being transmitted over communication paths which provide for higher quality signal transmission; while limiting the further transmission of signal copies which are being transmitted over communication paths demonstrating poor signal quality; thereby limiting the number of communications being transmitted through the repeaters 3, 4, and 5.

In this application, the term "good signal copy" is defined as those signal copies which when received by the second transceiver, provide all of the information intended to be conveyed by the signal. The term "fair signal copy" is defined as those signal copies which require further amplification of the signal at the first transceiver to yield some or all of the information which is desired to be transmitted by the signal. The term "poor signal copy" is defined as those signal copies which provide little or no desired information to the second transceiver with or without amplification of the original signal transmitted from the first transceiver. These terms, or closely related terms, may be utilized to determine which communication paths to transmit over.

The communication system illustrated in FIGS. 1a and 1b may utilize several operational techniques to transmit between the first transceiver and the second transceiver. A first operational technique of this invention is preferred when at least one of the communication paths is transmitting its signal copy at a good signal quality, while other communication paths are transmitting their signal copy at, less than a desired signal quality. In this case, only the highest quality signal(s) are utilized in the receiver portion 7r. Depending upon the specifics of the system, if there are a number of good signal copies which are being received by the second transceiver, then it may be desired to limit the future transmissions over one, two, or more of the "good signal copy" communication paths depending upon the use of the communication system, and other system characteristics. The controller 24 determines the signal quality, as determined by the signal quality detector 25, of the communication paths associated with repeater(s) 3, 4, 5 (by using the overlaying PN Code to associate the signal quality of each signal copy with the first transceiver which generated the signal copy).

A return signal is then sent, as illustrated in FIG. 1b, over all of the communication paths. The return signal, which contains information about the signal quality of each of the communication paths, is received by the receiver of each of the first transceivers and thereupon relayed to the frequency determination/combiner unit 11. The frequency determination/combiner unit 11 thereupon temporarily limits the transmission of all signals transmitted over the poor signal quality communication paths. Signal quality thresholding techniques could be used with this embodiment such that any time the second transceiver receives a signal of lower than a threshold limit, the second transceiver would relay a return signal via each first transceiver to the frequency determination/combiner unit 11 instructing it to limit further transmissions from that particular first transceiver.

A second operational technique of this invention pertains to the case when none of the communication paths are transmitting a good signal copy while at least one of the communication paths are transmitting a fair signal copy. The controller determines the quality of each signal copy using the above described BER or SNR, or any other suitable signal quality detector.

The second technique temporarily limits signal transmissions over the communication paths which are transmitting poor signal copies; while amplifying at least some of the signal copies over those communication paths which are transmitting a fair signal copy. The number of communication paths which are transmitting a fair signal copy is a design choice, but two are typically preferred (unless, or course, only one communication path is transmitting a fair signal copy.) The controller 24 accomplishes this by sending a return signal over all of the communication paths to the frequency determination/combiner unit 11 requesting suitable amplification of the signal over the corresponding communication paths which are transmitting fair signal copies. The first transceiver 1a, 1b, 1n so commanded then increases the signal strength of all further signal transmissions of the first transceiver associated with the communication paths which are transmitting a fair signal copy within the present cycle. Since the repeaters are substantially linear, the increased strength of the signal copy applied to any of the repeater will result in an increased signal strength applied from the repeater to the second transceiver.

The repeaters which have been deactivated by the above described techniques during a cycle may be reactivated by a corresponding command from the second transceiver 7 where there is no adequate signal copy being transmitted from the first transceiver to the second transceiver; or alternately may simply be reactivated periodically under a signal quality determination scheme. Under such a scheme, the first transceivers 1a, 1b, 1n will occasionally send a pilot signal (as described below) such that the second transceiver can maintain an accurate record of the signal quality of the signal copies being generated by each of the first transceiver (s). The frequency determination/combiner unit 11 can then command the appropriate first transceiver (s) to transmit over the most efficient communication paths. The pilot signal will be transmitted continuously over each of the communication paths, such that the signal quality detector 25 can once again determine the signal quality which each communication path is capable of transmitting. The signal quality determination cycles are typically repeated hundreds of times per second.

The number of communication paths which are transmitting at any given time could vary depending upon the conditions of the communication path. However, it is desirable that a total of at least one, and preferably two, good signal copies are continually being transmitted from the first transceivers to the second transceiver. If there are no good signals, then the preferably the two best fair signals can be amplified as described above.

One important consideration of the present invention is that the signal transmission over repeaters (with which energy associated with transmitting signal plays a major concern) can be controlled by the ground based controller 24. The software of the controller can be modified as different numbers and types of repeaters are used. If a certain first transceiver control scheme is found to be faulty, the appropriate software of the controller 24 can be modified or altered to provide the most efficient control scheme for the first transceivers.

Signal Quality Detection Cycle

The present invention envisions that the signal quality evaluations over each of the communication paths should be updated continually (preferably at the rate of several hundred times per second.) The updating cycles may use either pilot signals, or alternately, a portion of the signal being transmitted over the length of the communication system (referred to herein as an "information signal") the second transceiver to be used in the evaluation of signal quality. A pilot signal is not an information signal, but it is instead a relatively short signal (and possibly an error code if the signal quality is determined by BER, or a similar technique). In both cases of where a pilot signal or an information signal is used to evaluate signal quality, a buffer (not illustrated) is used to store all portions of the information signal until such time as it is determined that the appropriate segments of the information signal have been fully received at the other end of the communication system using error detection or other known techniques.

If a pilot signal is used, the pilot signal is applied continuously. After the communication system of the present invention determines which communication paths are transmitting signals of relatively good quality, then one or more signal copies of the signal which are being conveyed along the length of the communication system are transmitted from the first transceiver to the second transceiver.

If an information signal is used to determine the signal quality, then at the beginning of each signal quality determination cycle, signal copies containing signal copies of the information signals are transmitted from each first transceiver to the second transceiver over each of the communication paths. The return signals are transmitted from the second transceiver to the first transceiver as soon as this information signal has been transmitted.

System Functional Overview

The present invention provides a repeater based, spread spectrum communication system with high energy efficiency which is substantially fade free. The system utilizes multiple paths defined by a plurality of first transceivers, and a second transceiver via a plurality of first communication repeaters. The first and/or second transceivers may be mounted upon a mobile platform. The plurality of repeaters may be terrestrial, in satellites in low earth orbit, or in satellites in geosynchronous earth orbit.

Fade resistance is achieved by monitoring the signal copies received by the second transceiver to determine which communication paths are being partially or fully blocked. If there are one or more paths for signal copies which are being received with a threshold signal quality (as described above), then all desired communications will be transmitted through at least some of these communication paths. If all of the communication paths are transmitting fair or poor quality signal copies, then the information signal will be amplified and transmitted through at least some of the paths which are transmitting fair signal copies in general proportion to the signal quality of the particular communication path. The higher quality communication paths being amplified will contribute a proportionately higher percentage of the final signal. The receiver of the second transceiver processes and combines the multiple received signals to produce an output signal with reduced fading characteristics, and will result in a minimal expenditure of energy from the repeaters. Through the use of the invention the fading depth is maintained at an acceptable level, even when one or more of the repeater paths completely drops out due to fading or shadowing.

Each transmitter and receiving omni-directional antenna 7a of the second transceiver 7 is located so that it cumulatively covers all possible positions of the plurality of repeaters. The modulation technique may be either phase shift keying (PSK) or frequency shift keying (FSK) using a spread spectrum (SS) overlay of either a fast frequency hopping (FFH) or a direct sequence type. Other modulation types which are also known in the art may also be employed.

The second transceiver 7 receiver portion 7r utilized in the present invention includes circuitry for receiving multiple identical transmitted signals; each of the signals arriving at the receiver antenna 7a travels from a first transceiver 1a, 1b, in through a different propagation path such that each copy experiences a distinct propagation delay. The receiver portion 7r also includes circuitry for performing a spread spectrum correlation on each of those received signals to produce an output of multiple correlated signals. There is a PN code overlay in each signal copy transmitted along each communication path, wherein the second transceiver is capable of determining from which first transceiver each signal copy originated.

The receiver portion 7a also includes a received signal equalizer for providing, as an output, a plurality of equalized correlated signals. The equalizer includes circuitry for equalizing the propagation delays of each of the correlated signals to a largest propagation delay; equalizing a Doppler frequency offset for each correlated signal; and equalizing a phase shift for each correlated signal. The receiver further includes circuitry for combining together all equalized correlated signals to provide a demodulator with a composite received signal. The combining circuitry weighs each equalized correlated signal in proportion to the quality of that signal, such that those copies having a greater signal quality contribute a greater proportion to the content of the composite signal than do those signals having a lesser signal strength.

This invention includes a device for determining the quality of each of the signal copies transmitted from each first transceiver (via the repeaters) to the second transceiver. A goal of this invention is to transmit the majority of the signal over the communication path (or paths) which are capable of conveying a highest quality signal. Since the time frame in which signals gain or lose signal quality occurs in the range of milli-seconds, it is important that the sampling rate be at least at this rate. If none of the path (or paths) have a high quality signal, then it is desired to increase the signal strength in each of the paths which have a signal in proportion to the quality of their signals. Repeaters which are not transmitting a suitable signal to the second transceiver would not receive any signal, for some predetermined time, from the first transceiver. In effect, the intent is to transmit through, and thus limit the overall power used, only those repeaters whose signal is received at a suitable level by the second transceiver. Those repeater transmissions which are weak are not required and are thus disabled. This provides an extremely energy efficient system with which to provide reliable communication (considering the minimal energy available to the satellite based repeaters, or even some terrestrial based repeaters).

It is noted that while this disclosure has applied multiple first transceiver units 1a, 1b, 1c with a single second transceiver 7, similar results could be achieved where there are multiple first transceivers and a plurality of second transceivers. Any configuration of monitoring signal quality of signals generated from multiple first transceivers via communication paths to a second transceiver (and eliminating the weaker signals using the above technique) is within the scope of the present invention.

While the invention has been particularly shown and described with respect to a preferred embodiment thereof, it will be understood by those skilled in the art that changes in form and details of a manner such as to one having ordinary skill in the art may be made therein without departing from the scope and spirit of the invention.

What is claimed is:

1. A satellite communication system, comprising:
a plurality of satellite-based signal repeaters in low earth orbit;
a groundstation comprised of a plurality of code division multiple access (CDMA) spread spectrum transceivers, each of said plurality of transceivers being coupled to a directional antenna for transmitting spread spectrum signals to and for receiving spread spectrum signals from one of said plurality of signal repeaters;
a user terminal comprised of a CDMA spread spectrum transceiver that is coupled to an omni-directional antenna for simultaneously transmitting spread spectrum signals to and for receiving spread spectrum signals from two or more of said directional antennas via two or more of said plurality of signal repeaters;
wherein at least two of said plurality of spread spectrum transceivers of said groundstation simultaneously transmit a same communication signal to said user terminal through different ones of said plurality of repeaters, said transmitted communication signals being identifiable one from the other;

wherein said user terminal is comprised of circuitry for repetitively determining a signal quality of each communication signal received through at least some of said different ones of said plurality of repeaters, and for periodically and simultaneously transmitting a signal indicating said determined signal qualities back to said groundstation through said at least some of said different ones of said plurality of repeaters; and wherein said groundstation is responsive to a receipt of the periodically transmitted signal from said user terminal for selectively and independently activating the transmission of, deactivating the transmission of, and controlling the transmission power of individual ones of said plurality of spread spectrum transceivers that are simultaneously transmitting said same communication signal through said different ones of said plurality of repeaters.

2. The satellite communication system of claim 1, wherein said signal quality determining means utilizes at least one of an error rate, a carrier to noise ratio, or a correlation measure of each received signal copy.

3. The satellite communications system of claim 1, wherein said user terminal is further comprised of a plurality of receiver channels individual ones of which can be assigned to correlate one of said identifiable signals transmitted from said groundstation, an equalizer for equalizing said correlated signals to compensate at least for a difference in path length and Doppler frequency offset between the correlated signals, and a combiner for combining the equalized signals to provide a composite received signal.

4. The satellite communications system of claim 3, wherein said circuitry for repetitively determining a signal quality of each communication signal is disposed before said combiner.

* * * * *